United States Patent
Eikema et al.

(10) Patent No.: US 12,468,777 B2
(45) Date of Patent: Nov. 11, 2025

(54) SAMPLING FROM DISCRETE ENERGY-BASED MODELS WITH QUALITY/EFFICIENCY TRADE-OFF

(71) Applicant: NAVER CORPORATION, Gyeonggi-do (KR)

(72) Inventors: Bryan Eikema, Amsterdam (NL); German Kruszewski, Saint Mandé (FR); Hady Elsahar, Grenoble (FR); Stéphane Clinchant, Grenoble (FR); Marc Dymetman, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 557 days.

(21) Appl. No.: 17/877,336

(22) Filed: Jul. 29, 2022

(65) Prior Publication Data
US 2024/0037184 A1    Feb. 1, 2024

(51) Int. Cl.
*G06F 17/18*    (2006.01)
*G09B 7/00*    (2006.01)

(52) U.S. Cl.
CPC .............. *G06F 17/18* (2013.01); *G09B 7/00* (2013.01)

(58) Field of Classification Search
CPC .. G06F 17/18; G06F 16/3346; G06F 16/3329; G09B 7/00; G06N 20/00
See application file for complete search history.

(56) References Cited

U.S. PATENT DOCUMENTS

| | | | |
|---|---|---|---|
| 2013/0096877 A1* | 4/2013 | Dymetman | G06F 17/18 702/181 |
| 2013/0338999 A1* | 12/2013 | Dymetman | G06F 17/18 704/9 |
| 2020/0104707 A1* | 4/2020 | Azadi | G06N 3/088 |
| 2022/0083852 A1* | 3/2022 | Parshakova | G06N 3/08 |

OTHER PUBLICATIONS

Grover, A., Gummadi, R., Lazaro-Gredilla, M., Schuurmans, D., & Ermon, S. (2018, March). Variational rejection sampling. In International Conference on Artificial Intelligence and Statistics (pp. 823-832). PMLR. (Year: 2018).*
Dave, Rahul, Rejection Sampling, Oct. 2020, IACS class AM 207 Rejection Sampling lecture (Year: 2020).*
Grover, Aditya, Variational Rejection Sampling, Apr. 2018, AISTATS 2018, Ermon Group (Year: 2018).*

(Continued)

*Primary Examiner* — Pierre Louis Desir
*Assistant Examiner* — Nathaniel James Wilkins

(57) ABSTRACT

A sampling system includes: an energy-based model (EBM) configured to generate non-negative scores of an input having discrete classifications, respectively; and a sampling module configured to: generate a sample from a probability distribution of the EBM using a proposal distribution; set a probability of acceptance of the sample based on a minimum of (a) 1 and (b) an acceptance value determined based on the sample, a score of the sample from the EBM, the proposal distribution, and an upper boundary value; determine a distribution value between 0 and 1 using a uniform distribution; and discard the sample when the distribution value is greater than the probability of acceptance of the sample.

22 Claims, 9 Drawing Sheets

(56) References Cited

OTHER PUBLICATIONS

Brown et al. "Language Models are Few-Shot Learners" Jul. 22, 2020. John Hopkins University (Year: 2020).*
Grover et al. "Variational Rejection Sampling" 2018, Proceedings of the 21st International Conference on AI and Statistics (Year: 2018).*
Christophe Andrieu, Nando De Freitas, Arnaud Doucet, and Michael I Jordan. An introduction to mcmc for machine learning. Machine learning, 50(1):5-43, 2003.
Bannard, Colin, and Chris Callison-Burch. "Paraphrasing with Bilingual Parallel Corpora." In *Proceedings of the 43rd Annual Meeting on Association for Computational Linguistics—ACL '05*, 597-604. Ann Arbor, Michigan: Association for Computational Linguistics, 2005.
Caffo, B. S. "Empirical Supremum Rejection Sampling." Biometrika 89, No. 4: 745-54.2002.
Chafaï, Djalil. Back to basics—Total variation distance, 2010.
Chib, Siddhartha and Greenberg Edward. Understanding the metropolis-hastings algorithm, 1995.
Christian P. Robert. 2016. The Metropolis-Hastings algorithm. arXiv: 1504.01896 [stat].
Cowles, Mary Kathryn, and Bradley P Carlin. "Markov Chain Monte Carlo Convergence Diagnostics: A Comparative Review," 1996.
Deng, Yuntian, Anton Bakhtin, Myle Ott, Arthur Szlam, and Marc'Aurelio Ranzato. "Residual Energy-Based Models for Text Generation," 2020.
Du, Yilun, Shuang Li, Joshua Tenenbaum, and Igor Mordatch. "Improved Contrastive Divergence Training of Energy-Based Models," 2021.
Eikema, Bryan, and Wilker Aziz. "Sampling-Based Approximations to Minimum Bayes Risk Decoding for Neural Machine Translation." arXiv, Oct. 25, 2022.
Fabio Petroni, Tim Rocktaschel, Patrick Lewis, Anton Bakhtin, YuxiangWu, Alexander H Miller, and Sebastian Riedel. 2019. Language models as knowledge bases? arXiv preprint arXiv:1909.01066.
Fan, Angela, Mike Lewis, and Yann Dauphin. "Hierarchical Neural Story Generation." *In Proceedings of the 56th Annual Meeting of the Association for Computational Linguistics* (vol. 1: Long Papers), 889-98. Melbourne, Australia: Association for Computational Linguistics, 2018.
George Casella, Christian P Robert, Martin T Wells, et al. 2004. Generalized accept-reject sampling schemes. In a Festschrift for Herman Rubin, pp. 342-347. Institute of Mathematical Statistics.
Geyer, Charles. "Introduction to Markov Chain Monte Carlo" In Steve Brooks, Andrew Gelman, Galin Jones, and Xiao-Li Meng, editors, Handbook of Markov Chain Monte Carlo, vol. 20116022. Chapman and Hall/CRC.
Goyal, Kartik, Chris Dyer, and Taylor Berg-Kirkpatrick. "Exposing the Implicit Energy Networks behind Masked Language Models via Metropolis—Hastings." arXiv, Mar. 15, 2022.
Grathwohl, Will, Kevin Swersky, Milad Hashemi, David Duvenaud, and Chris J Maddison. "Oops I Took a Gradient: Scalable Sampling for Discrete Distributions," 2021.
Graves, Alex. "Sequence Transduction with Recurrent Neural Networks." arXiv, Nov. 14, 2012.
Grover et al., Variation rejection samples. In AISTATS, 2018.
Guanghui Qin and Jason Eisner. 2021. Learning How to Ask: Querying LMs with Mixtures of Soft Prompts. arXiv:2104.06599 [cs].
Gutmann, Michael, and Aapo Hyvarinen. "Noise-Contrastive Estimation: A New Estimation Principle for Unnormalized Statistical Models," 2010.
Hastings, W K. "Monte Carlo Sampling Methods Using Markov Chains and Their Applications," 1970.
He, Tianxing, Bryan McCann, Caiming Xiong, and Ehsan Hosseini-Asl. "Joint Energy-Based Model Training for Better Calibrated Natural Language Understanding Models." *In Proceedings of the 16th Conference of the European Chapter of the Association for Computational Linguistics: Main Volume*, 1754-61. Online: Association for Computational Linguistics, 2021.
Hinton, Geoffrey E. "Training Products of Experts by Minimizing Contrastive Divergence." *Neural Computation* 14, No. 8: 1771-1800. 2002.
Holtzman, Ari, Jan Buys, Li Du, Maxwell Forbes, and Yejin Choi. "The Curious Case of Neural Text DeGeneration," 2020.
Hyvarinen, Aapo. "Estimation of Non-Normalized Statistical Models by Score Matching,", 2005.
Jeffrey Rosenthal. 2011. Optimal Proposal Distributions and Adaptive MCMC. In Steve Brooks, Andrew Gelman, Galin Jones, and Xiao-Li Meng, editors, Handbook of Markov Chain Monte Carlo, vol. 20116022. Chapman and Hall/CRC.
Khalifa, Muhammad, Hady Elsahar, and Marc Dymetman. "A Distributional approach to Controlled Text Generation" 2021.
Lecun, Yann, Sumit Chopra, Raia Hadsell, Marc'Aurelio Ranzato, and Fu Jie Huang. "A Tutorial on Energy-Based Learning," 2006.
Liang, Paul Pu, Chiyu Wu, Louis-Philippe Morency, and Ruslan Salakhutdinov. "Towards Understanding and Mitigating Social Biases in Language Models," 2021.
Lin, Chu-Cheng, Aaron Jaech, Xin Li, Matthew R. Gormley, and Jason Eisner. "Limitations of Autoregressive Models and Their Alternatives." In *Proceedings of the 2021 Conference of the North American Chapter of the Association for Computational Linguistics: Human Language Technologies*, 5147-73. Online: Association for Computational Linguistics, 2021.
Liu et al. Rejection control and sequential importance sampling. JASA, 1998.
Liu, Jun S, Rong Chen, and Wing Hung Wong. "Rejection Control and Sequential Importance Sampling," 1998.
Mallinson, Jonathan, Rico Sennrich, and Mirella Lapata. "Paraphrasing Revisited with Neural Machine Translation." In Proceedings of the 15th Conference of the European Chapter of the Association for Computational Linguistics: vol. 1, Long Papers, 881-93. Valencia, Spain: Association for Computational Linguistics, 2017.
Martino, Luca, David Luengo, and Joaquin Miguez. "Accept-Reject Methods." In Independent Random Sampling Methods, by Luca Martino, David Luengo, and Joaquin Miguez, 65-113. Statistics and Computing. Cham: Springer International Publishing, 2018.
Metropolis, Nicholas, Arianna W. Rosenbluth, Marshall N. Rosenbluth, Augusta H. Teller, and Edward Teller. "Equation of State Calculations by Fast Computing Machines." *The Journal of Chemical Physics* 21, No. (6): 1087-92. 1953.
Miao Ning et al. Do you have the right scissors? Tailoring pretrained language models via monte-carlo methods. ACL 2020.
Miao, Ning et al. CGMH: constrained sentence generation by metropolis-hastings sampling. In the 33rd AAAI, 2019.
Naskar Subhajit et al. Energy-based reranking : improving renural machine translation using energy-based models. ArXiv, 2020.
Ng Nathan et al. Facebook FAIR's WMT19 news translation task submission. Proceedings of the Fourth Conference on Machine Translation, 2019.
Øivind Skare, Erik Bølviken, and Lars Holden. 2003. Improved sampling-importance resampling and reduced bias importance sampling. Scandinavian Journal of Statistics, 30(4):719-737.
Owen Art B, Importance Sampling. In Monte Carlo theory, methods and examples, chapter 9. 2013.
Parisi, G. "Correlation Functions and Computer Simulations." *Nuclear Physics B* 180: 378.1981.
Parshakova, Tetiana, Jean-Marc Andreoli, and Marc Dymetman. "Distributional Reinforcement Learning for Energy-Based Sequential Models." ArXiv, Dec. 18, 2019.
Parshakova, Tetiana, Jean-Marc Andreoli, and Marc Dymetman. Global Autoregressive Models for Data-Efficient Sequence Learning. In Proceedings of the 23rd Conference on Computational Natural Language Learning. 2019.
Radford, Alec, Jeffrey Wu, Rewon Child, David Luan, Dario Amodei, and Ilya Sutskever. "Language Models are Unsupervised Multitask Learners," 2019.
Reimers, Nils, and Iryna Gurevych. "Sentence-BERT: Sentence Embeddings Using Siamese BERT-Networks." In Proceedings of

(56) References Cited

OTHER PUBLICATIONS the 2019 Conference on Empirical Methods in Natural Language Processing and the 9th International Joint Conference on Natural Language Processing (EMNLP-IJCNLP), 3980-90. Hong Kong, China: Association for Computational Linguistics, 2019.

Robert, Christian P and Casella George, "Monte Carlo Statistical Methods" Springer-Verlag. 2004.

Roy, Vivekananda. "Convergence Diagnostics for Markov Chain Monte Carlo," 2020.

Rubin, Donald B. "The Calculation of Posterior Distributions by Data Augmentation: Comment: A Noniterative Sampling/Importance Resampling Alternative to the Data Augmentation Algorithm for Creating a Few Imputations When Fractions of Missing Information are Modest: The SIR Algorithm." *Journal of the American Statistical Association* 82(398): 543-546, 1987.

Sheng, Emily, Kai-Wei Chang, Premkumar Natarajan, and Nanyun Peng. "The Woman Worked as a Babysitter: On Biases in Language Generation." In Proceedings of the 2019 Conference on Empirical Methods in Natural Language Processing and the 9th International Joint Conference on Natural Language Processing (EMNLP-IJCNLP), 3405-10. Hong Kong, China: Association for Computational Linguistics, 2019.

Song Yang and Ermon Stefano, Improved techniques for training score-based generative models. arXiv. 2020.

Song Yang and Kingmn Diederik, How to train your energy-based models. arXiv. 2021.

T. Brown, B. Mann, Nick Ryder, Melanie Subbiah, J. Kaplan, P. Dhariwal, Arvind Neelakantan, Pranav Shyam, Girish Sastry, Amanda Askell, Sandhini Agarwal, Ariel Herbert-Voss, G. Kruger, Tom Henighan, R. Child, Aditya Ramesh, D. Ziegler, Jeffrey Wu, Clemens Winter, Christopher Hesse, Mark Chen, E. Sigler, Mateusz Litwin, Scott Gray, Benjamin Chess, J. Clark, Christopher Berner, Sam McCandlish, A. Radford, Ilya Sutskever, and Dario Amodei. 2020. Language models are few-shot learners. ArXiv, abs/2005.14165. GPT-3.

Taesup Kim and Yoshua Bengio. 2016. Deep directed generative models with energy-based probability estimation. CoRR, abs/1606.03439.

Tierney, Luke. "Exploring Posterior Distributions Using Markov Chains," 1992.

Von Neumann, John. Various techniques used in connection with random digits. National Bureau of Standards Applied Math Series, 12:36-38, 1951.

Xiang Lisa Li and Percy Liang. 2021. Prefix-Tuning: Optimizing Continuous Prompts for Generation. arXiv:2101.00190 [cs].

Zanella, Giacomo. "Informed Proposals for Local MCMC in Discrete Spaces." arXiv, Nov. 20, 2017.

Zhang, Maosen, Nan Jiang, Lei Li, and Yexiang Xue. "Language Generation via Combinatorial Constraint Satisfaction: A Tree Search Enhanced Monte-Carlo Approach." In *Findings of the Association for Computational Linguistics: EMNLP 2020*, 1286-98. Online: Association for Computational Linguistics, 2020.

Zhu, Yaoming, Sidi Lu, Lei Zheng, Jiaxian Guo, Weinan Zhang, Jun Wang, and Yong Yu. "Texygen: A Benchmarking Platform for Text Generation Models." In *The 41st International ACM SIGIR Conference on Research & Development in Information Retrieval*, 1097-1100. Ann Arbor MI USA: ACM, 2018.

\* cited by examiner

Algorithm 1 QRS [RS]

Require: $P, q, \beta$      ▷ $0 < \beta < \infty$
1: while True do
2:    $x \sim q$
3:    $r_x \leftarrow \min(1, P(x)/\beta q(x))$    [vs.    $r_x \leftarrow P(x)/\beta q(x)$]    ▷ Acceptance prob.
4:    $u \sim U_{[0,1]}$      ▷ $U_{[0,1]}$: unif. dist. over $[0,1]$
5:    if $u \leq r_x$ then
6:      output $x$

FIG. 5

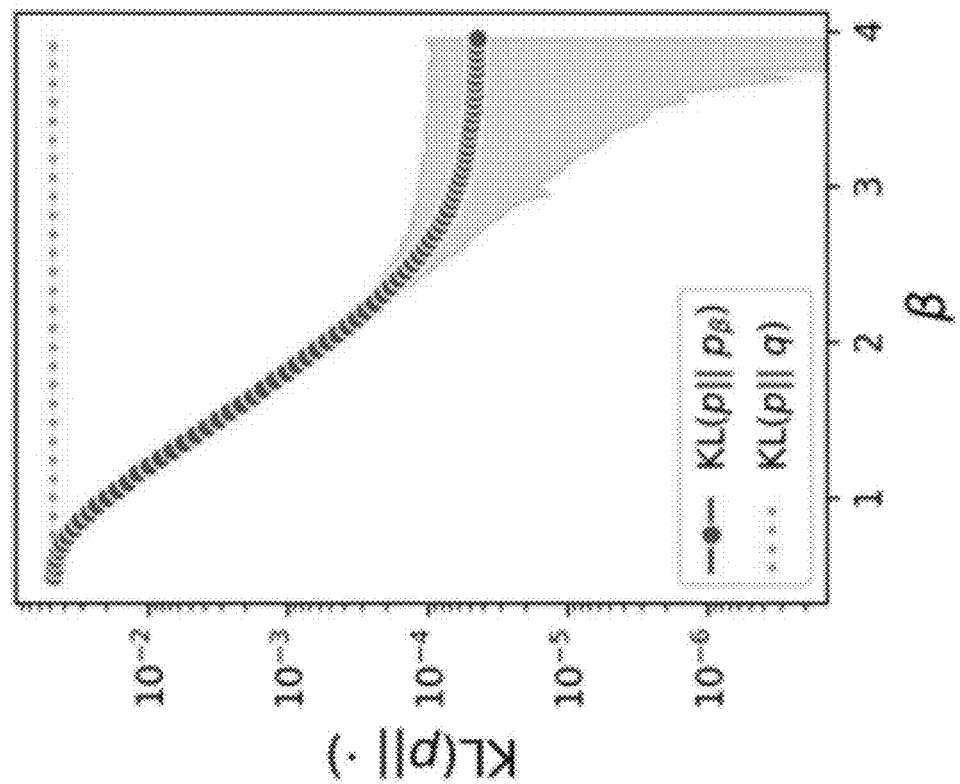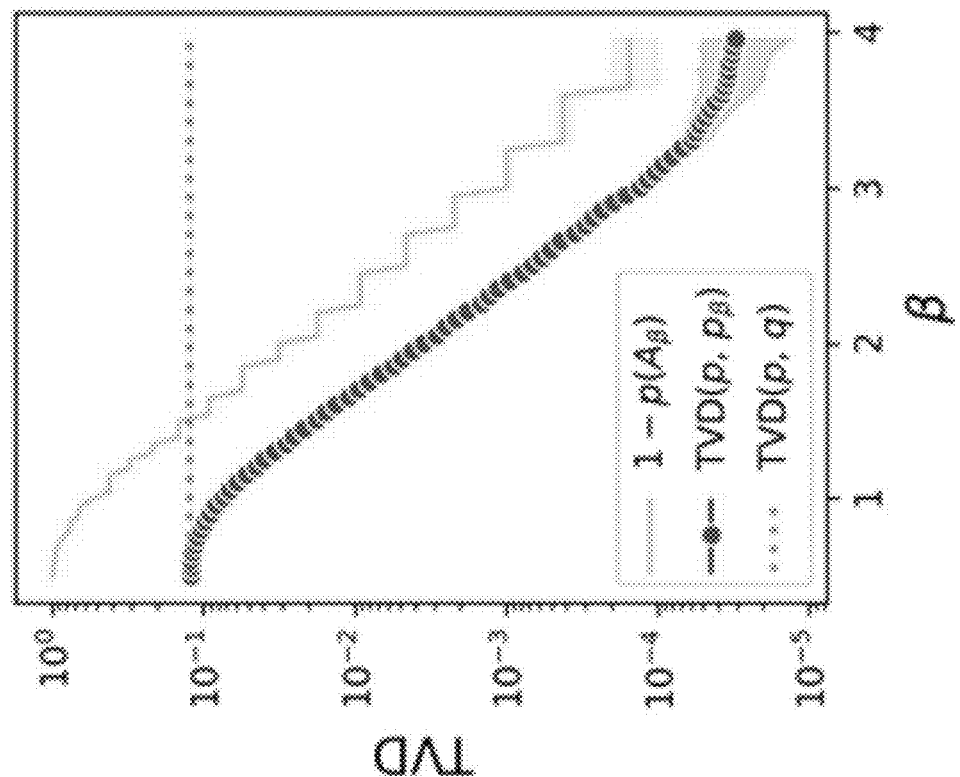
FIG. 6A

Algorithm 3 QRS with incremental pruning

Require: $P$, proposal $q$, desired number of samples $n$, minimum acceptance rate $ar_{min}$.

```
 1: procedure QRS-INCREMENTAL
 2:     S ← [ ], β ← 0, A ← [ ], β_max ← 0
 3:     while |S| < n do
 4:         x ~ q(·)
 5:         β_x ← P(x)/q(x)
 6:         β_max ← PERCENTILE(A, ar_max)
 7:         if min(β_x, β_max) > β then
 8:             β ← min(β_x, β_max)
 9:             S ← PRUNE(S, β)
10:         u_x ~ Unif(0, 1)
11:         α_x ← β_x/β                                    ▷ i.e. u_x < P(x)/βq(x)
12:         if α_x > β then
13:             S ← S + [(x, α_x)]
14:             A ← A + [(α_x)]
15:     return S
16: procedure PRUNE(S, β)
17:     keep (x, α_x) in S iff α_x > β
18: procedure PERCENTILE(A, r)
19:     return max α_x in A s.t. |α_y ∈ A : α_y ≤ α_x| < r|A|.      ▷ i.e. u_x < P(x)/βq(x)
```

FIG. 7

SAMPLING FROM DISCRETE ENERGY-BASED MODELS WITH QUALITY/EFFICIENCY TRADE-OFF

FIELD

The present disclosure relates to energy-based models (EBMs) and more particularly to sampling from EBMs.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Energy-based models are probabilistic models that include an energy function that determines the scores for outputting certain items. Mathematically, a probabilistic system is characterized by a probability distribution that determines likely states of the system. The energy function determines unnormalized and non-negative energy values (scores) to all possible states for an input.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc. Energy based models may be used in various different environments.

SUMMARY

In a feature, a sampling system includes: an energy-based model (EBM) configured to generate non-negative scores of an input having discrete classifications, respectively; and a sampling module configured to: generate a sample from a probability distribution of the EBM using a proposal distribution; set a probability of acceptance of the sample based on a minimum of (a) 1 and (b) an acceptance value determined based on the sample, a score of the sample from the EBM, the proposal distribution, and an upper boundary value; determine a distribution value between 0 and 1 using a uniform distribution; and discard the sample when the distribution value is greater than the probability of acceptance of the sample.

In further features, the sampling module is configured to determine the acceptance value using the equation: $P(x)/\beta q(x)$, where P is the probability distribution of the EBM, q is the proposal distribution of the EBM, x is the sample, and $\beta$ is the upper boundary value.

In further features, the upper boundary value is a predetermined positive number.

In further features, the sampling module is configured to accept the sample when the distribution value is less than the probability of acceptance of the sample.

In further features, the sampling module is configured to: determine a difference between a probability of the sample and a target probability; and selectively adjust one or more parameters based on the difference.

In further features, the sampling module is configured to adjust the upper boundary value based on the difference.

In further features, the sampling module is configured to: determine a KL divergence based on a probability of the sample and a target probability; and selectively adjust one or more parameters based on the KL divergence.

In further features, the sampling module is configured to adjust the upper boundary value based on the KL divergence.

In further features, the sampling module is configured to selectively adjust the upper boundary value such that an acceptance rate of samples does not become less than a predetermined minimum acceptance rate.

In further features, the sampling module is configured to set the upper boundary value to a highest possible value such that the acceptance rate of stored samples is not less than the predetermined minimum acceptance rate.

In a feature, a question answering system includes: the sampling system; and a question answering module, wherein the input is a question, and where the question answering module is configured to output the sample, as the answer to the question, when the distribution value is less than the probability of acceptance of the sample.

In a feature, a sampling method includes: by an energy-based model (EBM), generating non-negative scores of an input having discrete classifications, respectively; generating a sample from a probability distribution of the EBM using a proposal distribution; setting a probability of acceptance of the sample based on a minimum of (a) 1 and (b) an acceptance value determined based on the sample, a score of the sample from the EBM, the proposal distribution, and an upper boundary value; determining a distribution value between 0 and 1 using a uniform distribution; and discarding the sample when the distribution value is greater than the probability of acceptance of the sample.

In further features, the sampling method further includes determining the acceptance value using the equation: $P(x)/\beta q(x)$, where P is the probability distribution of the EBM, q is the proposal distribution of the EBM, x is the sample, and $\beta$ is the upper boundary value.

In further features, the upper boundary value is a predetermined positive number.

In further features, the sampling method further includes accepting the sample when the distribution value is less than the probability of acceptance of the sample.

In further features, the sampling method further includes: determining a difference between a probability of the sample and a target probability; and selectively adjusting one or more parameters based on the difference.

In further features, the sampling method further includes adjusting the upper boundary value based on the difference.

In further features, the sampling method further includes: determining a KL divergence based on a probability of the sample and a target probability; and selectively adjusting one or more parameters based on the KL divergence.

In further features, the sampling method further includes adjusting the upper boundary value based on the KL divergence.

In further features, the sampling method further includes selectively adjusting the upper boundary value such that an acceptance rate of samples does not become less than a predetermined minimum acceptance rate.

In further features, the sampling method further includes setting the upper boundary value to a highest possible value such that the acceptance rate of stored samples is not less than the predetermined minimum acceptance rate.

In a feature, a sampling system includes: an energy-based model (EBM) configured to generate non-negative scores of an input having discrete classifications, respectively; and a means for: generating a sample from a probability distribution of the EBM using a proposal distribution; setting a probability of acceptance of the sample based on a minimum of (a) 1 and (b) an acceptance value determined based on the sample, a score of the sample from the EBM, the proposal distribution, and an upper boundary value; determining a distribution value between 0 and 1 using a uniform distribution; and discard the sample when the distribution value is greater than the probability of acceptance of the sample.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 includes pseudo code for an example implementation of a quasi rejection sampling (QRS) technique;

FIGS. 6A and 6B includes example graphs illustrating estimations of sampling quality, efficiency and the tradeoff between them for use of the QRS technique;

FIG. 7 includes pseudo code for an example algorithm for QRS using incremental pruning.

In the drawings, reference numbers may be reused to identify similar and/or identical elements.

DETAILED DESCRIPTION

Machine reading and comprehension and natural language processing is progressing. Fact checking and question answering are also progressing. An energy based model (EBM) can be used to determine scores of an input corresponding to particular classifications, respectively. The present application involves use of quasi rejection sampling (QRS), which is a Monte-Carlo (MC) based approached that obtains high quality samples from the EBM given a reasonable proposal distribution. Advantageously in doing so, there exists the potential to decouple, for any generative task, modelling (by tuning the EBM definition) from efficient sampling (by tuning the proposal distribution).

In contrast with Markov Chain Monte-Carlo (MCMC) techniques, the QRS technique discussed herein provides explicit convergence bounds and diagnostics, which allow for judging the quality of the approximation at different levels of efficiency. In the example of controlled natural language generation, QRS can be used to obtain samples from the EBM that impose a set of distributional constraints on the generations of a pretrained language model including the EBM. QRS allows for approximation to a predetermined precision at the cost of some sampling efficiency, which leads to a quality/efficiency trade-off that can be tuned for the application.

Figure 1:
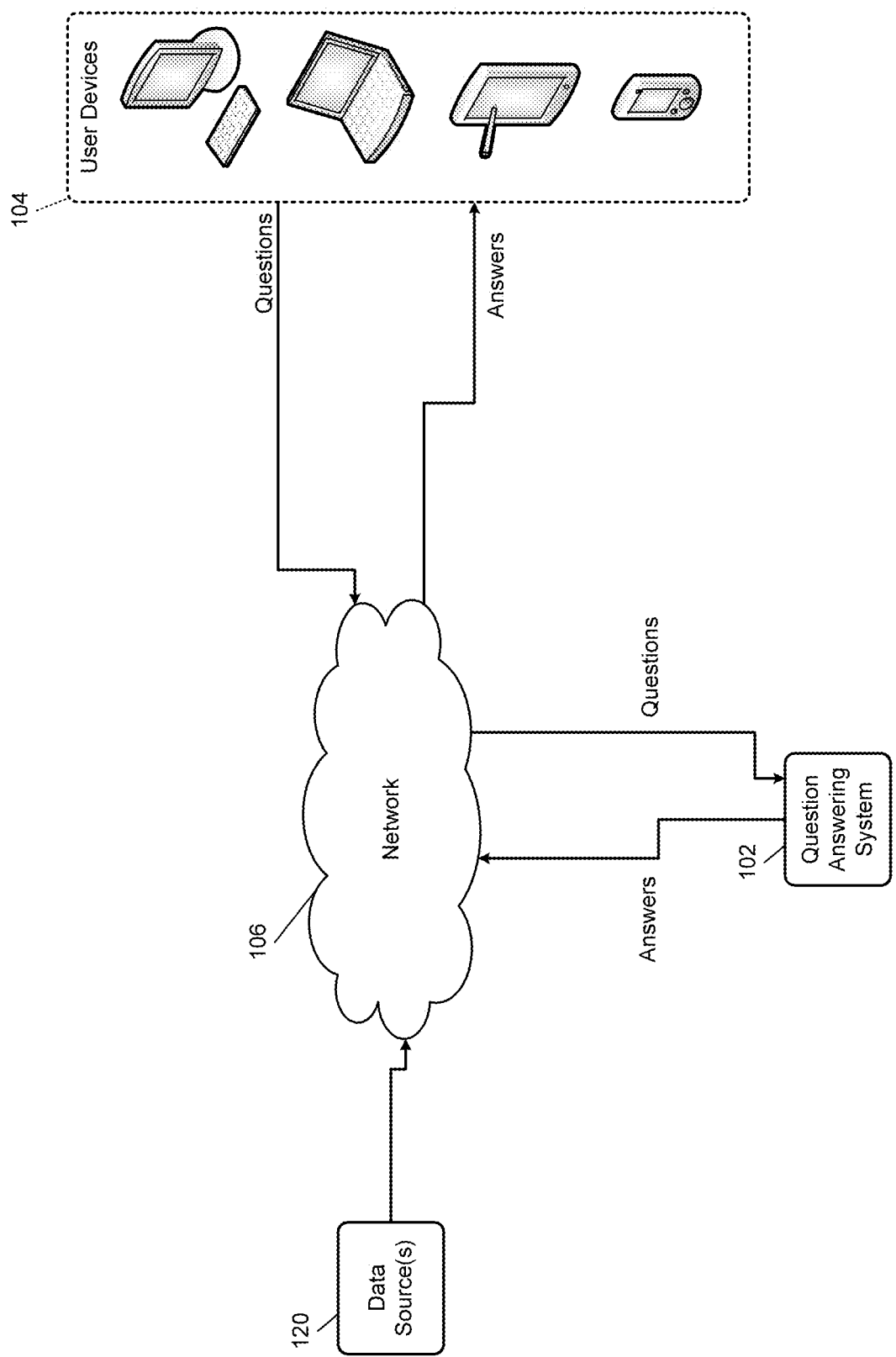
FIG. 1 includes a functional block diagram including a question answering system configured to respond to queries (e.g., including questions, respectively)

FIG. 1 includes a functional block diagram including a question answering system 102 configured to respond to queries (e.g., including questions, respectively). The question answering system 102 is configured to receive queries from one or more user computing device(s) 104 via a network 106. The question answering system 102 may determine possible answers to questions using one or more bodies of text, such as text stored in memory at the question answering system 102 or elsewhere and retrieved based on the queries.

The question answering system 102 may read the bodies of text and determine possible answers to the questions from the bodies of text, respectively. The question answering system 102 transmits the possible answers back to the computing devices 104 that transmitted the questions, respectively.

The computing devices 104 may output (e.g., display or output audibly) the possible answers or links (e.g., hyperlinks) to websites for the possible answers to users. The computing devices 104 may also output other information to the users. For example, the computing devices 104 may output additional information related to the bodies of text, respectively, information relevant to the possible answers, respectively, etc. The question answering system 102 and the computing devices 104 communicate via a network 106.

A plurality of different types of computing devices 104 are illustrated in FIG. 1. The computing devices 104 include any type of computing devices that is configured to generate and transmit questions to the question answering system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, robots, televisions, consoles (e.g., smart speakers without displays Amazon Echo, Google Home, Clova Friends mini) or other appliances (e.g., networked refrigerators, networked thermostats, etc.).

The computing devices 104 may use a variety of different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the question answering system 102 while running operating systems other than those operating systems described above, whether presently available or developed in the future.

In some examples, a computing device 104 may communicate with the question answering system 102 using an application installed on the computing device 104. In general, a computing device 104 may communicate with the question answering system 102 using any application that can transmit questions to the question answering system 102 to be answered by the question answering system 102. In some examples, a computing device 104 may run an application that is dedicated to interfacing with the question answering system 102, such as an application dedicated to question answering. In some examples, a computing device 104 may communicate with the question answering system 102 using a more general application, such as a web-browser application. The application executed by a computing device 104 to communicate with the question answering system 102 may display a search field on a graphical user interface (GUI) in which the user may enter questions. The user may enter a question using a touchscreen or physical keyboard, a speech-to-text program, or other form of user input.

A question entered into a GUI on a computing device 104 may include words, numbers, letters, punctuation marks, and/or symbols. In general, a question may be a request for information retrieval (e.g., possible answers) from the question answering system 102. For example, a question may be directed to providing possible answers from a specific body of text that is responsive to the question.

A computing device 104 may receive possible answer from the question answering system 102 that is responsive to the question transmitted to the question answering system 102. In various implementations, the computing device 104 may receive and the question answering system 102 may transmit a filtered subset of possible answers to the question.

In various implementations, the question answering system 102 may determine a score value (indicative of a likelihood of that the answer is correct) for each of the individual possible answers and provide the score values along with the possible answers to the computing device 104. The computing device 104 may display more than one of the multiple possible answers (e.g., all possible answers having a score value that is greater than a predetermined value), only the possible answer with the highest score value, etc.

The computing device 104 may be running (executing) an application including a GUI that displays the possible answer(s) received from the question answering system 102. The respective score value(s) may also be displayed. For example, the application used to transmit the question to the question answering system 102 may also present (e.g., display or speak) the received possible answers to the user. As described above, the application that presents the received possible answers to the user may be dedicated to interfacing with the question answering system 102 in some examples. In other examples, the application may be a more general application, such as a web-browser application.

The GUI of the application running on the computing device 104 may display the answer(s) to the user in a variety of different ways, depending on what information is transmitted to the computing device 104. In examples where the search results include a list of possible answers and associated probability or score values, the question answering system 102 may transmit the list of possible answers and respective values to the computing device 104. In this example, the GUI may display the possible answer(s) to the user as a list of possible answers.

In some examples, the question answering system 102, or other computing system, may transmit additional information to the computing device 104 such as, but not limited to, applications and/or other information associated with the text, the question, or the possible answers, other bodies of text associated with the body of text, etc. This additional information may be stored in a data store and transmitted by the question answering system 102 to the computing device 104 in some examples. In examples where the computing device 104 receives the additional information, the GUI may display the additional information along with the answer(s). In some examples, the GUI may display the possible answers ordered from the top of the display to the bottom of the display by descending probability or score value. In some examples, the possible answers may be displayed under the search field in which the user entered the question.

In some examples, computing devices 104 may communicate with the question answering system 102 via a partner computing system. The partner computing system may include a computing system of a third party that may leverage the search functionality of the question answering system 102. The partner computing system may belong to a company or organization other than that which operates the question answering system 102. Example third parties which may leverage the functionality of the question answering system 102 may include, but are not limited to, internet search providers and wireless communications service providers. The computing devices 104 may send questions to the question answering system 102 via the partner computing system. The computing devices 104 may also receive possible answers from the question answering system 102 via the partner computing system. The partner computing system may provide a user interface to the computing devices 104 in some examples and/or modify the user experience provided on the computing devices 104.

As stated above, the computing devices 104 may transmit the body of text from which to generate the possible answers along with the question (for the body of text). Alternatively, the question answering system 102 may obtain the body of text from a data source 120. Bodies of text may also be referred to as text corpuses. The data sources 120 may include a variety of different text providers. The data sources 120 may include digital distribution platforms such as, but are not limited to, online news sources, websites, websites that include web logs (i.e., blogs), social networking sites (e.g., Facebook, Twitter, etc.), and/or other types of data sources (e.g., news feeds).

The computing devices 104, the question answering system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

While the example of a question answering system is provided, the present application is also applicable to content (e.g., video, audio, text, etc.) provider systems fact checking systems, natural language processing systems, translation systems, paraphrasing systems, and other types of systems. In content provider systems, the question answering system may be referred to as a content provider system and would provide possible content (e.g., video, audio, text, etc.) for consumption in response to input from a computing device.

Figure 2:
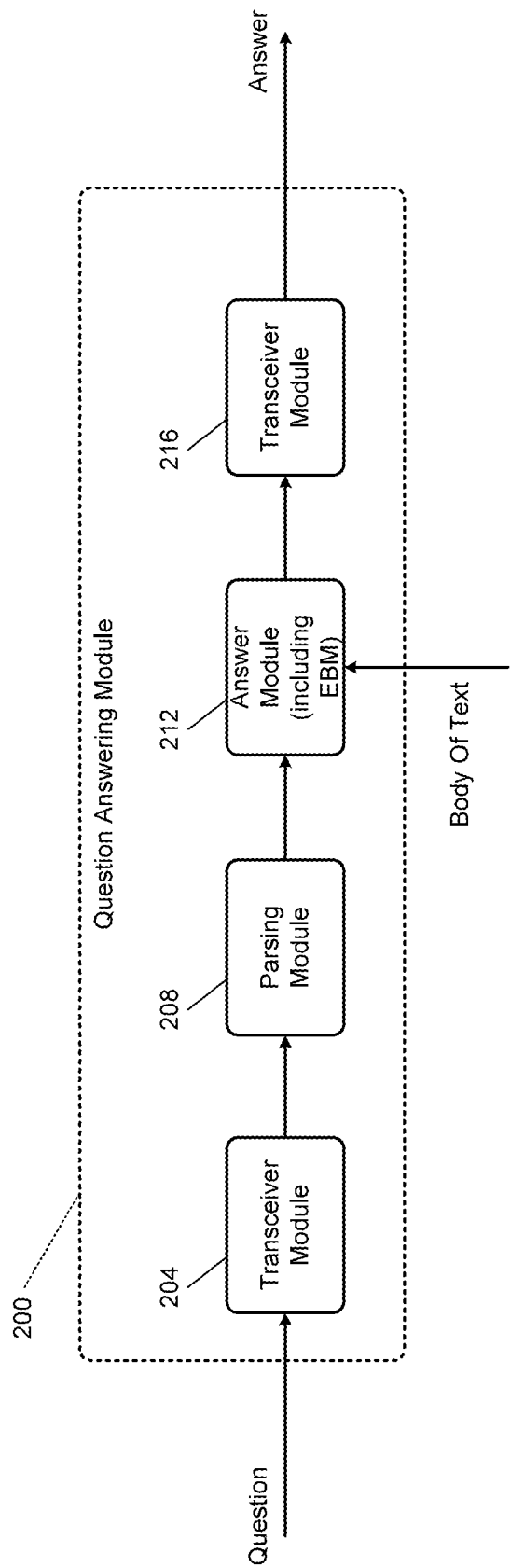
FIG. 2 is a functional block diagram including an example implementation of the question answering module of the question answering system.

FIG. 2 is a functional block diagram including an example implementation of the question answering module 200 of the question answering system 102. A first transceiver module 204 receives a query including a question from a computing device 104. The transceiver module 204 may also receive a body of text from the computing device 104 or retrieve the text from another source.

A parsing module 208 parses the query to obtain the question that is to be answered. The parsing module 208 may, for example, identify a string of one or more words forming the question to be answered. The parsing module 208 may also correct any misspelled words in the question and/or perform one or more other word processing and/or natural language processing functions on the question (e.g., morphological analysis, syntactical analysis, and query expansion).

An answer module 212 determines the possible answer to the question. The body of text may be transmitted by the computing device 104 along with the question. Alternatively, the body of text may be obtained by the answer module 212 from a data source. The answer module 212 may determine the body of text to be obtained, for example, based on the question. As an example, the question may be, "how many different monster trucks are there in the book Elbow Grease?". In this example, the answer module 212 may determine that the body of text from which to generate the answer is the book Elbow Grease. The answer module 212 may obtain the text of the book Elbow Grease from a data source. In the example above, the answer module 212 may determine that question is "how many different monster trucks are there?".

The answer module 212 includes an energy based model (EBM) configured to determine possible answers being output to the computing device.

A second transceiver module 216 transmits the determined possible answers to the question back to the computing device 104. In various implementations, the second transceiver module 216 may be omitted, and the first transceiver module 204 may transmit the possible answers back to the computing device 104 from which the question was received.

Figure 3:
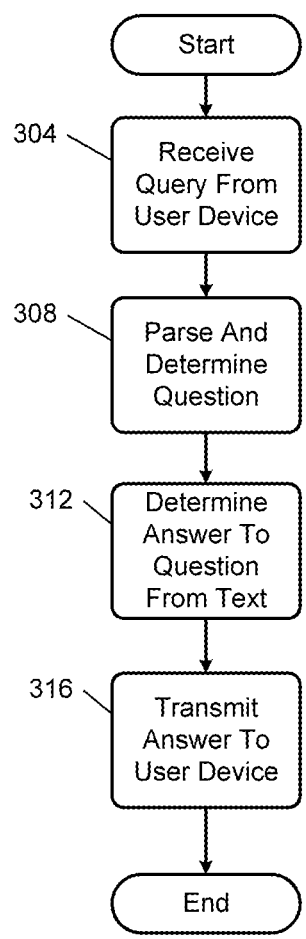
FIG. 3 includes a flowchart depicting an example method of receiving a question and providing possible answers to the question.

FIG. 3 includes a flowchart depicting an example method of receiving a question and providing possible answers to the question. The example of FIG. 3 may be performed by the question answering module 200.

Control begins with 304 where the question answering module 200 receives a query from a computing device 104. The query includes a question to determine possible answers to. The query may also include the body of text that is to be used as the basis for answering the question, or the body of text may be accessed by the question answering module 200. At 308, the question answering module 200 parses the query and determines the question to be answered.

At 312, the question answering module 200, using the EBM, determines the possible answers to the question. At 316, the question answering module 200 transmits the possible answers to the computing device 104 from which the query was received.

Figure 4:
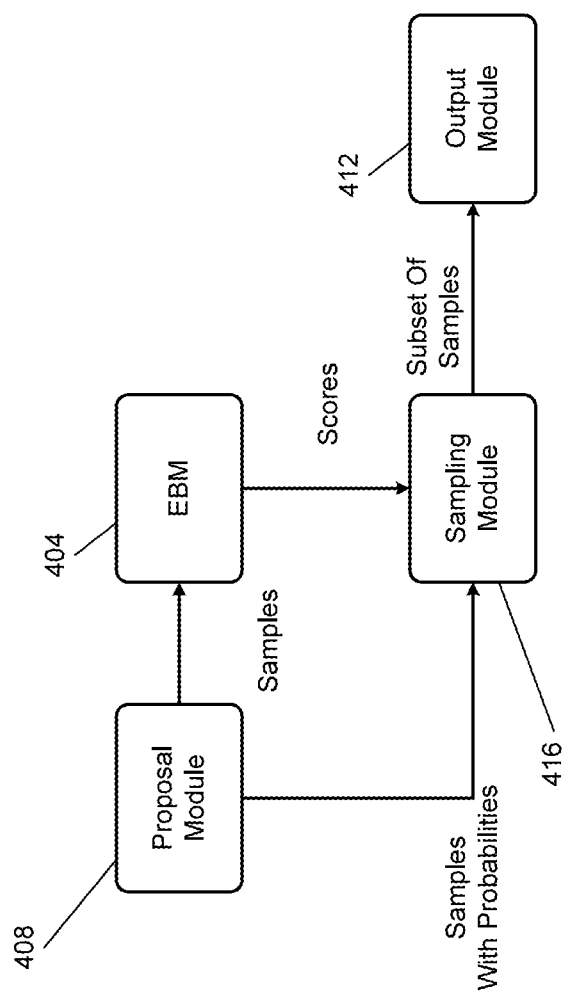
FIG. 4 is a functional block diagram of an example output system for an energy based model (EBM)

FIG. 4 is a functional block diagram of an example output system for an EBM 404, such as of the answer module 212. A proposal module 408 is configured to input samples (e.g., video, text, audio, etc.) to the EBM 404. The EBM 404 generates scores for the samples. The scores are non-negative numbers. Unlike probability values for the samples that sum to 1 (corresponding to a total of 100%), score values are non-negative values that need not necessarily sum to 1. The proposal module 408 provides the samples and their probabilities, respectively, of being output to the sampling module.

Generally speaking, the sampling module 416 is configured to filter the samples (according to the example of FIG. 5) to produce a subset of the samples, as discussed further below. An output module 412 is configured to output the subset of the samples (e.g., the possible answers) to the computing device.

The sampling module 416 is configured to generate a sample from the EBM 404 using a proposal distribution. The sampling module 416 is configured to set a probability of acceptance of the sample based on a minimum of (a) 1 and (b) an acceptance value determined based on the sample, a score of the EBM, a proposal distribution of the EBM, and an upper boundary value. The sampling module 416 is configured to determine a distribution value between 0 and 1 using a uniform distribution. The sampling module 416 is also configured to discarding the sample when the distribution value is greater than the probability of acceptance (output) of the sample. The sampling module 416 is configured to accept the sample (for outputting) when the distribution value is less than the probability of acceptance of the sample. The sampling module 416 does this for each of the samples.

In various implementations, the sampling module 416 is configured to determine the acceptance value using the equation $P(x)/\beta q(x)$, where P is the scoring of the EBM 404, q is the proposal distribution of the EBM 404, x is the sample, and $\beta$ is the upper boundary value. The upper boundary value may be a predetermined positive number. The sampling module 416 is configured to accept the sample when the value is less than the probability of acceptance of the sample.

In various implementations, the sampling module 416 is configured to: determine a difference between a probability of the sample and a target probability; and selectively adjust one or more parameters based on the difference. The one or more parameters may include the upper boundary value.

In various implementations, the sampling module 416 is configured to: determine a KL divergence based on a probability of the sample and a target probability; and selectively adjust one or more parameters based on the difference. The one or more parameters may include the upper boundary value.

In various implementations, the sampling module 416 is configured to selectively adjust the upper boundary value such that an acceptance rate of samples does not become less than a predetermined minimum acceptance rate. In various implementations, the sampling module 416 is configured to set the upper boundary value to a highest possible value such that the acceptance rate of stored samples is not less than the predetermined minimum acceptance rate.

Consider a discrete (countable) sample space X. X may include a set of finite sequences over linguistics tokens, but may be an arbitrary discrete space. The EBM 404 includes a non-negative real function P (x) over X such that a partition function $$Z \doteq \Sigma_{x \in X} P(x)$$

is only positive and finite.

P can be associated with a normalized probability distribution $$p(x) \doteq Z^{-1} P(x).$$

The sampling module 416 is a generator w of elements from X (the training samples) such that the generator w produces a sample x with a probability w(x) as close as possible to a predetermined target probability p(x). Closeness is described further below.

Assume a proposal distribution q(x) such that (1) a score q(x) can be calculated for any x∈X., (2) samples can be generated from q, and support of q includes support of p such that $$p(x) > 0 \rightarrow q(x) > 0.$$

The proposal q is selected and configured to provide a starting point toward the target p as discussed further below.

The present application involves sampling using a quasi-rejection sampling (QRS) technique that is different than rejection sampling (RS) and different than Markov Chain Monte-Carlo (MCMC) techniques, such as Metropolis-Hastings. FIG. 5 includes pseudo code for an example implementation of the QRS technique used herein. Used in FIG. 5 are the EBM probability distribution P, the proposal distribution q, and an upper bound β which is a finite (and predetermined) positive number. Line 1 involves starting a loop. Line 2 involves generating a sample from the proposal distribution. The left of line 3 involves computing the probability of accepting the sample generated. A minimum of 1 and the P(x)/βq(x) is used. In standard RS, only P(x)/βq(x) would be used, as illustrated on the right of line 3 because β could only be chosen to upper bound P(x)/q(x). Line 4 involves generating a number between 0 and 1 with a uniform distribution. Line 5 involves determining whether the number u is less than the probability of acceptance $r_x$. If so, the sample is kept and output at line 6. If not, the sample is discarded.

In addition to P and q, QRS involves the input of a finite positive number β. QRS differs from standard RS in at least the following two aspects: (1) contrary to RS, QRS does not require β to be a global upper-bound of the quantity P(x)/q(x), for all x's in X, and (2), as shown on line 3, the "acceptance probability" $r_x$ is a generalization of the one used with RS, for cases where P(x)/βq(x)>1, a situation that cannot occur in RS.

Both RS and QRS produce an independent and identically distributed (i.i.d.) sequence of x's (line 6), where each x is generated with a probability written as $p_β(x)$. In the case of RS, $p_β = p$. RS has theoretical and practical limits satisfied by QRS, such as follows: (i) RS may require the existence of a finite upper-bound β (ii) this β needs to be known beforehand. However, these conditions typically do not hold for the proposals q that considered. For example, when q results from an auto-regressive approximation to p, there may be no obvious way to obtain a global upper-bound. Even if such a bound could be found, the resulting sampler could be extremely inefficient: as shown below, the "acceptance rate" of RS is proportional to 1/β, which can be small.

By relaxing the requirement that β be a global upper-bound, QRS loses the identity between $p_β$ and p. However, QRS becomes much more generally applicable and allows for a trade-off between the sampling efficiency of $p_β$ and its sampling quality, as measured by distributional discrepancy between $p_β$ and p[4].

The following will be discussed maintaining the notations above and using two discrepancy measures between distributions $p_1$ and $p_2$—the KL divergence and the total variance distance (TVD). KL divergence can be expressed as $$D_{KL}(p_1, p_2) \doteq \mathbb{E}_{x \sim p_1} \log\left[\frac{p_1(x)}{p_2(x)}\right].$$

The TVD can be expressed as:

$$TVD(p_1, p_2) \doteq 1/2 \Sigma_x |p_1(x) - p_2(x)|.$$

Define $$P_β(x) \doteq \min(P(x), βq(x))$$

and let $$Z_β \doteq \Sigma_{x \in X} P_β(x)$$

be the partition function of $P_β(x)$. Then $p_β$ is the normalized distribution associated with $P_β$ with $$p_β(x) = 1/Z_β P_β(x) \quad (1).$$

The acceptance rate $AR_β$ of the sampler $p_β$ is the proportion of q samples in line 2 of the algorithm of FIG. 5 that produces the output of line 6. $AR_β$ may be a decreasing function of β and $$AR_β = \mathbb{E}_{x \sim q} \min\left(1, \frac{P(x)}{βq(x)}\right) = Z_β/β. \quad (2)$$

Let $A_β \doteq \left\{x \in X : \frac{P(x)}{q(x)} \le β\right\}$ then $$TVD(p, p_β) \le 1 - p(A_β), \quad (3)$$

where $1 - p(A_β)$ is a non-strictly decreasing function of β with $$\lim_{β \to \infty} (1 - p(A_β)) = 0. \quad (4)$$

In other words, $p_β$ converges to p for β→∞.

Regarding equation (1) above, $p_β(x)$ is the probability that the first (or fixed k-th) output from the algorithm of FIG. 5 is equal to x. On the first step of the algorithm, the probability that a given x is accepted is $q(x)r_x$ while the probability that no x at all is accepted is $$ρ \doteq \Sigma_{x \in X} q(x)(1-r_x) = 1 - \Sigma_{x \in X} q(x)(r_x).$$

Stated Generally, the probability that x will be accepted at step i of the algorithm while no x was accepted on previous steps is $ρ^{i-1} q(x) r_x$. The probability $p_β(x)$ of x to be the first x to be accepted is $$\sum_{i=1}^{\infty} ρ^{i-1} q(x) r_x =$$

-continued $$q(x)r_x \sum_{i=1}^{\infty} \rho^{i-1} = \frac{1}{1-\rho}q(x)r_x = \frac{1}{\sum_{x \in X} q(x)(r_x)} q(x)r_x = \frac{1}{Z_\beta}P_\beta(x).$$

Regarding equation (2) above, $$AR_\beta = \mathbb{E}_{x \sim q}\min\left(1, \frac{P(x)}{\beta q(x)}\right) = \beta^{-1}\sum_{x \in X}\min(P(x), \beta q(x)) = \beta^{-1}\sum_{x \in X}P_\beta(x) = Z_\beta/\beta$$

Regarding equation (3) above, the reference property $TVD_{REF}$ of TVD will be used. For any distributions $p_1$, $p_2$ over X, $$TVD(p_1, p_2) = \sum_{x \in X: p_1(x) \geq p_2(x)} p_1(x) - p_2(x).$$

$$TVD(p_1, p_2) = 1/2 \sum_{x \in X} |p_1(x) - p_2(x)| =$$

$$1/2\left[\sum_{x \in X: p_1 \geq p_2(x)} p_1(x) - p_2(x)\right] + 1/2\left[\sum_{x \in X: p_1 < p_2(x)} p_1(x) - p_2(x)\right] =$$

$$\sum_{x \in X: p_1 \geq p_2(x)} p_1(x) - p_2(x)$$

Proof is as follows. Let $A_\beta \doteq \{x \in X : P(x) \leq \beta q(x)\}$ and $\bar{A}_\beta \doteq X \setminus A_\beta$. $P_\beta(x) \doteq \min(P(x), \beta q(x))$ and therefore $P_\beta(x) = P(x)$ for $x \in A_\beta$ and $P_\beta(x) < P(x)$ for $x \in \bar{A}_\beta$. $P_\beta$ may be less than or equal to P and thus $Z_\beta \leq Z$. For any x, we have $p_\beta(x) = Z_\beta^{-1}P_\beta(x)$ and $p(x) = Z^{-1}P(x)$, and hence for $x \in A_\beta$, $p(x) \leq p_\beta(x)$. if $C_\beta \doteq \{x \in X : p(x) \leq p_\beta(x)\}$, and $\bar{C}_\beta \doteq X \setminus C_\beta$, $A_\beta \subseteq C_\beta$ and $\bar{C}_\beta \subseteq \bar{A}_\beta$. Therefore, TVD $(p,p_\beta) = \Sigma_{x \in X:p(x) \geq p_\beta(x)}p(x) - p_\beta(x) = \Sigma_{x \in X:p(x) > p_\beta(x)}p(x) - p_\beta(x) = \Sigma_{x \in \bar{C}_\beta}p(x) - p_\beta(x) \leq \Sigma_{x \in \bar{C}_\beta}p(x)$. Finally:

$$TDV(p,p_\beta) \leq p(\bar{C}_\beta) \leq p(\bar{A}_\beta) = 1 - p(A_\beta). \quad (20)$$

Regarding equation (4) above, for a normalized distribution p over a discrete space X, for $\epsilon > 0$, there exists a finite subset $X' \subseteq X$ s.t. $p(X') > 1 - \epsilon$. If $$\beta \doteq \max_{x \in X'} \frac{P(x)}{q(x)}$$

then $X' \subseteq A_\beta$ and therefore $P(A_\beta) \geq 1 - \epsilon$.

The above has important practical implications concerning the production of explicit estimates for different quantities of interest. The sampling module 416 produces the estimates using importance sampling (IS) using q as the proposal distribution. All of the estimates may be based on a sample $\{x_1, \ldots, x_N\}$ of i.i.d. draws from q. If f is a real valued function on X, the following rewriting can occur $$\sum_{x \in X} f(x) = \mathbb{E}_{x \sim q} \frac{f(x)}{q(x)} \simeq N^{-1}\sum_{i \in [1,N]} \frac{f(x_i)}{q(x_i)}.$$

This gives $$Z \simeq N^{-1}\sum_{i \in [1,N]} \frac{P(x_i)}{q(x_i)} \quad (5)$$

$$Z_\beta \simeq N^{-1}\sum_{i \in [1,N]} \frac{P(x_i)}{q(x_i)} \quad (6)$$

$$p(A_\beta) \simeq N^{-1}\sum_{i \in [1,N]} \frac{P_\beta(x_i)}{Zq(x_i)}\mathbb{1}[x_i \in A_\beta] \quad (7)$$

$$\mathbb{E}_{x \sim q}f(x) \simeq N^{-1}\sum_{i \in [1,N]} \frac{P_\beta(x_i)}{Z_\beta q(x_i)}f(x_i) \quad (8)$$

where explicit values for $P_\beta(x_i)$ and $\mathbb{1}[x_i \in A_\beta]$ are available, such that $P_\beta(x) \doteq \min(P(x), \beta q(x))$ and $\mathbb{1}[x_i \in A_\beta] = 1$ if $P(x) \leq \beta q(x)$.

These estimates can be used to determine estimates of the discrepancies between p and $p_\beta$ by importance sampling with q. For example, $$TVD(p, p_\beta) = 1/2\sum_{x \in X}|p(x) - p_\beta(x)| = 1/2\mathbb{E}_{x \sim q}\left|\frac{P(x)}{Zq(x)} - \frac{P_\beta(x_i)}{Z_\beta q(x_i)}\right| \quad (9)$$

$$\simeq 1/2\sum_{i \in [1,N]}\left|\frac{P(x)}{Zq(x)} - \frac{P_\beta(x_i)}{Z_\beta q(x_i)}\right| \quad (10)$$

$$D_{KL}(p, p_\beta) = \sum_{x \in X}p(x)\log\frac{p(x)}{p_\beta(x)} = \log\frac{Z_\beta}{Z} + \mathbb{E}_{x \sim q}\frac{P(x)}{Zq(x)}\log\frac{P(x)}{P_\beta(x)} \quad (11)$$

$$\simeq \log\frac{Z_\beta}{Z} + N^{-1}\sum_{i \in [1,N]}\left|\frac{P(x_i)}{Zq(x_i)} - \frac{P_\beta(x_i)}{Z_\beta q(x_i)}\right|. \quad (12)$$

Other f-divergences between p and $p_\beta$ are also computable in analogous ways. Let $f(t)$ be a convex function from $\mathbb{R}_+$ to R such that $f(1) = 0$. Then, $$D_f(p, p_\beta) = \sum_{x \in X}p_\beta(x)f\left(\frac{p(x)}{p_\beta(x)}\right) \quad (13)$$

$$\simeq N^{-1}\sum_{i \in [1,N]}\frac{P_\beta(x_i)}{Z_\beta q(x_i)}f\left(\frac{Z_\beta P(x_i)}{ZP_\beta(x_i)}\right). \quad (14)$$

The present application involves generation with distributional control (GDC). Given a language model a(x), obtained by the sampling module 416 includes a model p(x) that constrains the moments of a set of n predefined features $\phi(x)$ to match predetermined (target) values $\mathbb{E}_{x \sim q}\phi(x) = \bar{\mu}$ while keeping the KL divergence (or another type of divergence) from the original language model a(x), KL(p,a) minimized. For example, the sampling module 416 may debias the original language model trained on a corpus of biographies to produce biographies of only scientists, 50% of which are female. In this example, the sampling module 416 would train $\phi_1(x)$ a binary classifier configured to determine whether (or not) a sentence speaks about a scientist while the sampling module 416 would train $\phi_2(x)$ a binary classifier to determine whether or not the sentence involves a female, with the target moments $\bar{\mu} = [1, 0.5]$ to represent 100% scientist and 50% female.

p can be expressed as an unnormalized EBM P(x) = a(x) b(x). In an implementation, pointwise constraints can be used in which $\bar{\mu} \in \{0,1\}^n$. For example, for classifying one binary feature for which $\forall x: \phi(x) = 1$ then b takes the form $b(x) = \phi(x)$. In the example of distributional constraints in which $\bar{\mu} \in \mathbb{R}^n$, there is a vector $\lambda \in \mathbb{R}^n$ such that $b(x) = \exp(\lambda^*\phi(x))$ and $p(x) \propto a(x)b(x)$ fulfills the requirement of moment matching and minimal KL (or other) divergence from the original model. Determining the vector $\lambda$ of parameters is performed by the sampling module 416 using self-normalized importance sampling by the sampling module 416 and stochastic gradient descent (SGD).

To sample from the EBM 404, the sampling module 416 uses a distributional policy gradient (DPG) algorithm, such as described in Tetiana Parashakova, et al., Distributional Reinforcement Learning for Energy-Based Sequential Models, CoRR, 2019, which is incorporated herein in its entirety. The sampling module 416 fine tunes an auto-regressive policy $\pi_\theta$ that approximates the target distribution p(x) to be sampled from. $\pi_\theta$ can be used as a proposal q for QRS to sample from p as detailed below.

Figure 6B:
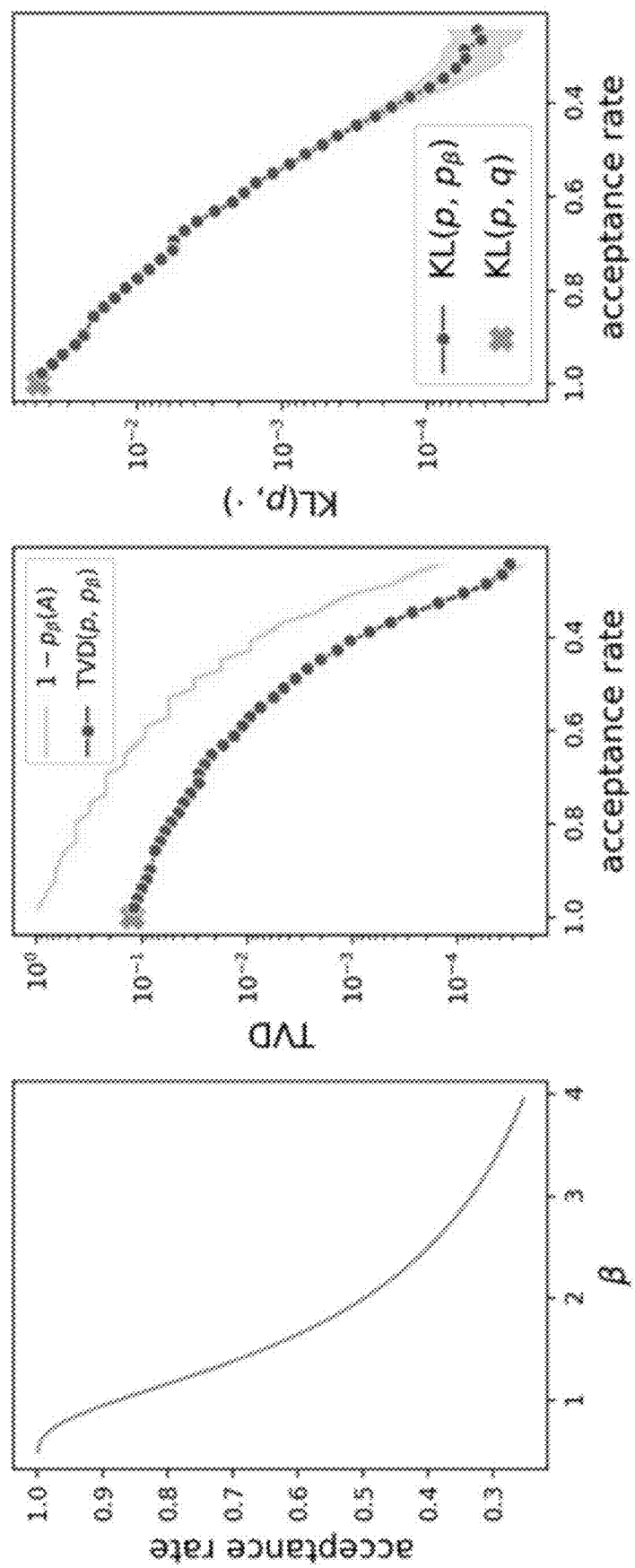

FIGS. 6A and 6B includes example graphs illustrating estimations of sampling quality (TVD and $D_{KL}$), efficiency (acceptance rate), and the tradeoff between them for the sampling module 416 using QRS sampling as illustrated in FIG. 5 using a proposal q=Poisson ($\lambda$=10) to approximate p=Poisson ($\lambda$=11) over five independent experiments with 10 million samples. p and q are two Poisson distributions with parameters $\lambda$=10 and $\lambda$=11, respectively. Using RS in this case would be impossible because the ratio of p/q cannot be upper bounded by any finite number for all $x \in X$.

Sampling using QRS as described herein is possible and practical to use. The upper boundary of the TVD can be calculated using equation (3) above. TVD and KL can be determined using equations (10) and (12) above. $\beta$=[0.5,4] in these examples. Efficiency is estimated by acceptance rate for different values of $\beta$.

The graphs of FIG. 6A and the left most graph of FIG. 6B illustrate quality and efficiency as a function of $\beta$. As shown, higher values of $\beta$ improve the TVD and KL divergence at a cost in terms of acceptance rate. TVD reaches low values with a moderate acceptance rate. The middle and right graphs of FIG. 6B illustrate the trade off between quality and efficiency based on the inverse of the acceptance rate curve and composing the inverse with the TVD and KL curves, thus providing a compact summary of the quality/efficiency trade-off.

QRS may be applied to a generation with distributional control (GDC) task performed by the sampling module 416, such as the GDC task described in Muhammad Khalifa, et al., A Distributional Approach to Controlled Text Generation, International Conference on Learning Representations, 2021, which is incorporated herein in its entirety. A goal is that of sampling from the EBM P((x)=a(x)b(x) where a(x) is the probability (or score) assigned to x by the base language model, and b(x) is a binary filter in the case of pointwise constraints or an exponential form in the example of distributional constraints. The sampling module 416 generates a fine-tuned model $\pi_\theta$ which serves as a baseline and as a proposal q that the sampling module 416 samples from. In the example of pointwise constraints, a naive filter sampler $q_{proj}$ may be used where the proposal distribution is projected into the constraint manifold by filtering out all samples that do not satisfy one or more predetermined criteria, such as include a predetermined word. This sampler may assign well defined probabilities to the sequences that are sampled, so estimates of TVD and KL divergence can be generated, as described above.

For testing, 1 million samples from the corresponding proposal were taken for each task to evaluate the proposal q, the projected proposal $q_{proj}$ (only for the pointwise constraint), and QRS sampling $p_\beta$ for a range of $\beta$ values selected based on estimating acceptance rates on a separate sample. Estimates of TVD, KL divergence, and acceptance rate were determined, along with a backward KL divergence from the language based model ($D_{KL}(\cdot\|a)$) calculated using equation (12) above, and the moments of features desired to control (e.g., based on equation (8) above). Incremental pruning, as discussed further below, may be used in various implementations.

The testing proved that the upper bound of the TVD of $p_\beta$ with p and the KL divergence from $p_\beta$ to p steadily converges toward 0 as the acceptance rate decreases. For the distributional constraints and corresponding proposal distributions, an acceptance rate of $10^{-3}$ may be sufficient to match the target EBM. Feature moments show the same pattern converging toward the target moments with lower acceptance rates. In some examples, the sampling module 416 matches the target EBM so closely that small inaccuracies in the lambda values obtained for the EBM estimation procedure may become apparent. Regarding the KL divergence from the original model the metric may follow a non-monotonic path at different acceptance rates. The moments computed downstream using QRS match the IS predictions closely giving confidence in the accuracy of those estimates. In the example of pointwise constraints, the naive filter strategy $q_{proj}$ may correspond to running the sampling module 416 using QRS with a higher acceptance rate.

In various implementations, incremental pruning may be used. This involves the sampling module 416 using QRS that incrementally builds a batch of samples S that have a target minimum acceptance rate $ar_{min}$. The sampling module 416 obtains samples x via the proposal module 408 from q and at least temporarily stores the samples in S as long as the rejection coefficient $$\alpha_x = \frac{P(x)}{q(x)u_x}$$

does not exceed the current value of $\beta$ where $u_x \sim U(0,1)$. Based on higher values of $\beta$ implying that a lower upper boundary on the TVD between the samples and the target distribution, the sampling module 416 adjusts $\beta$ to be as high as possible. The higher $\beta$ is, however, the lower the acceptance rate becomes. Therefore, the sampling module 416 upper limits (caps) $\beta$ at a highest possible value such that the acceptance rate of the samples is not less than a predetermined minimum acceptance rate $ar_{min}$. The corresponding maximum $\beta$ value such that the acceptance rate is greater than the predetermined minimum acceptance rate $ar_{min}$ corresponds to the value of $\alpha$ for which the percentage of all previously obtained samples satisfying $\alpha_x > \alpha$ is $ar_{min}$ (i.e., the percentile $ar_{min}$ of all previously computed $A=\{\alpha_x\}$ values). If $\beta$ is increased any further, previously stored samples in S would be removed by the sampling module 416 to remove those that failed to meet the acceptance criteria of $\alpha_x > \beta$.

Figure 8:
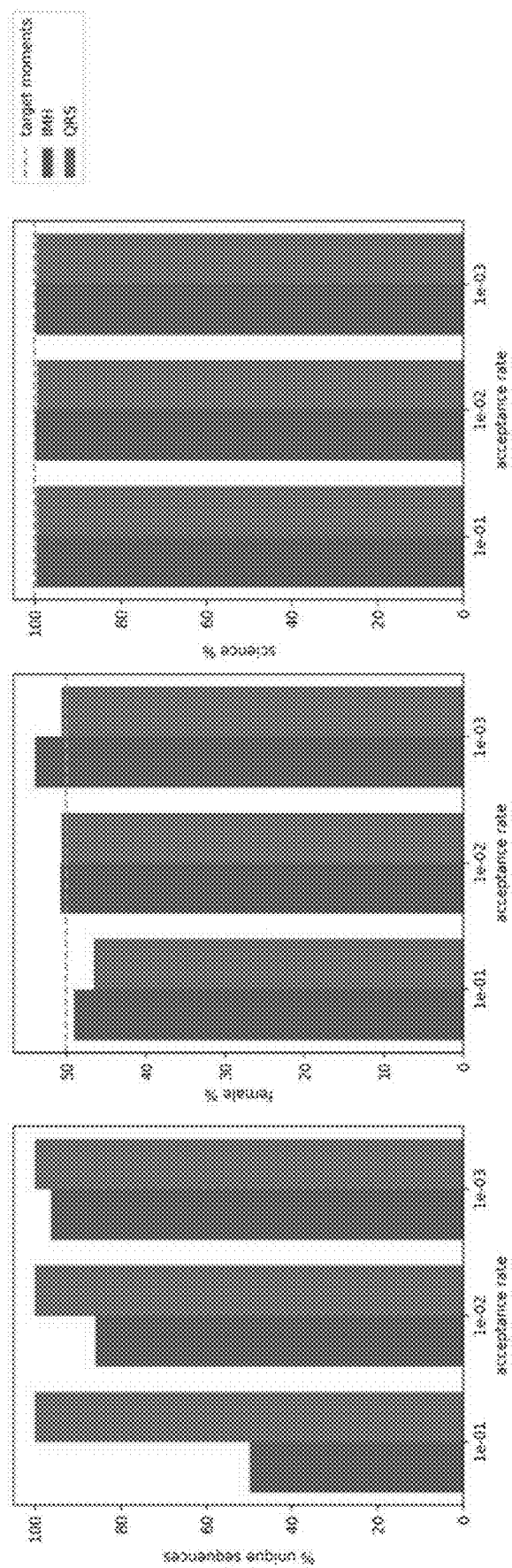
FIG. 8 illustrates that while achieving a similar constraint satisfaction is possible using Independent Metropolis-Hastings (IMH), IMH repeats some samples several times.

FIG. 7 includes pseudo code for an example algorithm for QRS using incremental pruning. Lines 16-17 involve pruning samples that do not meet the acceptance criteria of $\alpha_x > \beta$. FIG. 8 includes an example graph comparing acceptance rates in various circumstances for QRS with incremental pruning (using the algorithm of FIG. 7) with independent Metropolis-Hasting (IMH) sampling. Testing involved 50% female and 100% science with the EBM 404 by taking 1,000 samples from each sampler at different levels of acceptance rates. FIG. 8 illustrates that while achieving a similar constraint satisfaction is possible using IMH, IMH repeats some samples several times. This is illustrated by the fraction of unique samples used (left most graph). This may be an undesirable property of a sampler. The QRS disclosed herein does not do the same as QRS does not make use of a Markov chain.

Discussed herein is QRS (with and without incremental pruning) for sampling from the EBM 404. QRS generalizes rejection sampling and is applicable to cases in which no upper bound of $P(x)/q(x)$ is possible or known. QRS converges to a target distribution (see equation (4) above) and provides diagnostic abilities, such as an upper bound on the TVD (e.g., see equation (3)) and unbiased estimators of the TVD and KL divergence to the target distribution (e.g., see equations (9)-(12)). QRS achieves strong results, such as for natural language processing, where the sampling module 416 may debias the EBM 404 (language model) using acceptance rates, such as in the range of $10^{-1}$-$10^{-3}$.

While the example of using QRS in sampling from the EBM 404 is provided, the present application is also applicable to sampling from other probability distributions where a proposal distribution is available. Different ways may be used to construct proposal distributions, including by either i) prompting a pre-trained language model, ii) training an auto-regressive sequence model to approximate the EBM, or iii) making use of off-the-shelf machine translation models to specify conditional proposal distributions. In Table 1, for each example input sequence, there are set out three proposal distributions and their corresponding QRS samples.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for

TABLE 1

| Input Sequence | Proposal Distribution | QRS Sample |
| --- | --- | --- |
| How is the two wheeler insurance from Bharti Axa insurance? | What about bicycle insurance from Bharti Axa insurance? What about the Bharti Axa insurance? What is the Bharti Axa insurance plan? | How is the Axa Bharti two-wheeler insurance policy? How is Bharti Axa insurance for two-wheeler? The Bharti Axa Two-wheeler insurance. How is it? |
| Are there Doctor Who references in the Muse song "Knights of Cydonia"? | Do you hear a hint of doctors in the Muse songs "Knights of Cydonia"? Can you find a hint at Doctor Who in the "Knights of Cydonia" line from the book's Muse song? Are there any references to Doctor Who in a muse song, Knights of Cydonia? | Are there Doctor Who references in Muse's Knights of Cydonia? Does this Muse song "Knights of Cydonia" have any references to Doctor Who? Are there Doctor Who references in Muse's Knights of Cydonia? |
| In French, how do you say "cool"? | How do you call 'cool' in French? How do you keep the language Cool in French? How do you say 'cool' in French? | How to Say "cool" in French How to Say 'Cool' in French How do you say "cool" in French |

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
an input device configured to receive an input;
a sampling system comprising: a pre-trained energy-based model (EBM) configured to generate non-negative scores of the input having discrete classifications, respectively,
the input being a question; and
a sampling module configured to:
generate a sample from a probability distribution of the EBM using a proposal distribution;
set a probability of acceptance of the sample based on a minimum of (a) 1 and (b) an acceptance value determined based on the sample, a score of the sample from the EBM, the proposal distribution, and an upper boundary value;
determine a distribution value between 0 and 1 using a uniform distribution;
accept the sample when the distribution value is less than the probability of acceptance of the sample;
discard the sample when the distribution value is greater than the probability of acceptance of the sample,
a computing device providing content by performing one or more of question answering, fact checking, natural language processing, translation, and paraphrasing using the sample accepted by the sampling system, and
an output device outputting the content one or more of (a) audibly via at least one speaker and (b) visually via at least one display.

2. The system of claim 1 wherein the sampling module is configured to determine the acceptance value using the equation:

$P(x)/\beta q(x)$, where P is the probability distribution of the EBM, q is the proposal distribution of the EBM, x is the sample, and $\beta$ is the upper boundary value.

3. The system of claim 2 wherein the upper boundary value is a predetermined positive number.

4. The system of claim 1 wherein the input received by the input device is one or more of video, audio and textual content.

5. The system of claim 1 wherein the sampling module is configured to:
determine a difference between a probability of the sample and a target probability; and
selectively adjust one or more parameters based on the difference.

6. The system of claim 5 wherein the sampling module is configured to adjust the upper boundary value based on the difference.

7. The system of claim 1 wherein the sampling module is configured to:
determine a KL divergence based on a probability of the sample and a target probability; and
selectively adjust one or more parameters based on the KL divergence.

8. The system of claim 7 wherein the sampling module is configured to adjust the upper boundary value based on the KL divergence.

9. The system of claim 1 wherein the sampling module is configured to selectively adjust the upper boundary value such that an acceptance rate of samples does not become less than a predetermined minimum acceptance rate.

10. The system of claim 9 wherein the sampling module is configured to set the upper boundary value to a highest possible value such that the acceptance rate of stored samples is not less than the predetermined minimum acceptance rate.

11. The system of claim 1 wherein the computing device further comprises, when performing question answering:
- a question answering module, wherein the input is a question, and
- wherein the question answering module is configured to output the sample, as the answer to the question.

12. A method comprising:
- by an input device, receiving an input;
- by a pre-trained energy-based model (EBM), generating non-negative scores of the input having discrete classifications, respectively;
- generating a sample from a probability distribution of the EBM using a proposal distribution;
- setting a probability of acceptance of the sample based on a minimum of (a) 1 and (b) an acceptance value determined based on the sample, a score of the sample from the EBM, the proposal distribution, and an upper boundary value;
- determining a distribution value between 0 and 1 using a uniform distribution;
- discarding the sample when the distribution value is greater than the probability of acceptance of the sample;
- accepting the sample when the distribution value is less than the probability of acceptance of the sample;
- by a computing device, providing content by performing one or more of question answering, fact checking, natural language processing, translation, and paraphrasing using the sample accepted; and
- by an output device, outputting the content one or more of (a) audibly via at least one speaker and (b) visually via at least one display.

13. The method of claim 12 further comprising setting the acceptance value using the equation:

$P(x)/\beta q(x)$, where P is the probability distribution of the EBM, q is the proposal distribution of the EBM, x is the sample, and $\beta$ is the upper boundary value.

14. The method of claim 13 wherein the upper boundary value is a predetermined positive number.

15. The method of claim 12 wherein the input is one or more of video, audio and textual content.

16. The method of claim 12 further comprising:
- determining a difference between a probability of the sample and a target probability; and
- selectively adjusting one or more parameters based on the difference.

17. The method of claim 16 further comprising adjusting the upper boundary value based on the difference.

18. The method of claim 12 further comprising:
- determining a KL divergence based on a probability of the sample and a target probability; and
- selectively adjusting one or more parameters based on the KL divergence.

19. The method of claim 18 further comprising adjusting the upper boundary value based on the KL divergence.

20. The method of claim 12 further comprising selectively adjusting the upper boundary value such that an acceptance rate of samples does not become less than a predetermined minimum acceptance rate.

21. The method of claim 20 further comprising setting the upper boundary value to a highest possible value such that the acceptance rate of stored samples is not less than the predetermined minimum acceptance rate.

22. A system comprising:
- an input device configured to receive an input;
- a pre-trained energy-based model (EBM) configured to generate non-negative scores of the input having discrete classifications, respectively; and
- a means for:
  - generating a sample from a probability distribution of the EBM using a proposal distribution;
  - setting a probability of acceptance of the sample based on a minimum of (a) 1 and (b) an acceptance value determined based on the sample, a score of the sample from the EBM, the proposal distribution, and an upper boundary value;
  - determining a distribution value between 0 and 1 using a uniform distribution;
  - discarding the sample when the distribution value is greater than the probability of acceptance of the sample; and
  - accepting the sample when the distribution value is less than the probability of acceptance of the sample
- a computing device providing content by performing one or more of question answering, fact checking, natural language processing, translation, and paraphrasing using the sample accepted; and
- an output device outputting the content one or more of (a) audibly via at least one speaker and (b) visually via at least one display.

* * * * *